Patented Aug. 17, 1948

2,446,992

UNITED STATES PATENT OFFICE 2,446,992

PROCESS FOR THE PRODUCTION OF PURE WHITE DISCHARGING EFFECTS ON CELLULOSIC MATERIALS

Charles Babey, Basel, Switzerland, and Frederic Leathley Goodall, Burley-in-Wharfedale, England, assignors to J. R. Geigy A.-G., Basel, Switzerland No Drawing. Application September 27, 1946, Serial No. 699,632. In Switzerland September 26, 1945

Section 1, Public Law 690, August 8, 1946

7 Claims. (Cl. 8—69)

It is a known fact that dyeings resulting from copper-containing or after-coppered dyestuffs can be white discharged only with difficulties and in an unsatisfactory manner for practical purposes, even if said dyestuffs are derived from azo dyestuffs discharging in a pure white, when used in a metal-free condition. Particularly for the discharge printing on artificial silk only brownish to olive shades are obtained which do not satisfy the requirements of practice. As dyeings resulting from copper-containing or after-coppered dyestuffs are distinguished by very good light-fastness properties and often also by very good fastness properties in the moist state, a discharging method rendering possible the use of the said dyestuff class is particularly valuable.

With respect thereto it may be noted that a method for discharging dyeings with copper-containing dyestuffs has already become known, which method consists in that a reduction discharging with alkaline hydrosulfite is followed by an oxidation treatment of only the discharge area by means of hydrogen peroxide. In view of the color-destroying properties of hydrogen peroxide this method requires extreme caution in order to only bring the discharged places into contact with the oxidation agent, but not the remaining dyestuff. This fact renders difficult in practice the use of the said discharging method which per se is complicated for the reason that it necessitates two stages.

Furthermore, it is known to improve the fastness properties of dyeings in their moist state by subjecting the dyed material to an after-treatment with solutions of interaction products of low aliphatic aldehydes and compounds containing amino or imino groups, which interaction products are resinous per se or convertible into resinous compounds. For this purpose for example interaction products of formaldehyde and urea, thiourea, cyanamide, dicyanodiamide, melamine and the like as well as mixtures or interaction products of mixtures respectively of the said or similar compounds with formaldehyde have been recommended. It is true that by such a treatment the fastness properties of the dyeings in the moist state will be improved, but, on the other hand, this method shows the disadvantage that the lightfastness of the dyeings is considerably decreased. Such disadvantage may be removed by adding soluble copper salts containing ionogenous or complex bound copper, such as copper acetate, to the after treatment baths, whereby the influence of the fixation agent consisting in decreasing the light-fastness properties is diminished. Fixation agents, partly in combination with copper compounds, have already become known in the trade. When for instance cellulosic dyeings of dischargeable dyestuffs are made water-fast by means of the said copper-containing fixation agents, there sometimes arises the difficulty, and this particularly for dyeings on viscose rayon, that unobjectionable white discharges can no longer be produced with the usual discharge printing pastes containing hydrosulfite.

When, in order to avoid the said disadvantage, such dyeings are discharged on viscose rayon before the treatment thereof with the copper-containing fixation agent by means of a known and usual hydrosulfite containing discharge printing paste takes place, and when the materials are treated only subsequently with the copper-containing fixation agent in order to thus avoid the said disadvantage, nevertheless no white shades are produced, but only brownish discharge figures will result which are absolutely unsatisfactory for practical purposes.

We have now found that dyeings resulting from copper-containing dyestuffs which derive from azo dyestuffs being dischargeable in the metal-free condition can be discharged by means of hydrosulfite, while producing pure white areas, if agents yielding cyano ions are added to the discharge paste. Moreover, it is also possible, according to the present invention, to produce completely white discharges of metal-containing or metal-free dyeings of dyestuffs dischargeable in a metal-free condition, whose fastness properties and more particularly the fastness properties in the moist state, have been improved by means of the commonly used fixation agents with addition of copper salts. When working according to the present invention, it is of no importance whether dyestuffs resulting in a complex linkage with copper or dyestuffs of non-metallisable kind are to be treated. This is the more surprising, as the fixation effect most probably depends on the formation of water-insoluble, resinous covering layers on the treated and dyed material, which layers could be capable of preventing the passing of the discharge paste and of the cyano ion-yielding agent therethrough.

By the expression "agents yielding cyano ions" may be understood generally such compounds which, during the discharging process or steaming process yield sufficient cyano ions to remove the metal resulting from the copper-containing dyestuffs. As such agents may particularly be mentioned:

1. The soluble salts of hydrocyanic acid, like sodium cyanide, potassium cyanide and so on,
2. The insoluble salts of hydrocyanic acid, such as zinc cyanide, cadmium cyanide and the like, which either by hydrolysis or by chemical interaction, for instance with alkali carbonates, produce cyano ions during the discharging or steaming operation,
3. The complex salts of hydrocyanic acid, whose metallic central atom may be removed by copper, such as sodium zinc cyanide, potassium zinc cyanide, the solution of zinc cyanide in aqueous ammonia, sodium or potassium cadmium cyanide and so forth, and
4. Other methods giving cyano ions, such as the decomposition of cyanohydrines, e. g. formaldehyde cyanohydrine etc., which decomposition takes place under the existing conditions of the discharging and steaming method.

The addition of the agents yielding cyano ions to the discharge paste constitutes the most simple and preferred method. Of course, it is also possible, after the usual hydrosulfite discharging, to treat the discharged areas with agents yielding cyano ions.

By the expressions "cellulosic dyeings of dischargeable dyestuffs treated with copper-containing fixation agents" or "cellulosic materials dyed with dischargeable dyestuffs and treated with copper-containing agents" respectively used in the present specification and claims may be understood materials which are dyed with dyestuffs dischargeable in a metal-free condition. If such dyestuffs are metallisable, the expression "agents containing copper" means a copper salt which contains ionogenous or complex bound copper, or a copper-containing fastness improving agent. Should these dyestuffs not be metallisable, then the "agent containing copper" may be a copper salt containing ionogenous or complex bound copper and being used for instance in combination with a fastness improving agent, or also a copper containing fastness improving agent.

The present invention will now be illustrated by the following examples, without being limited thereto. The parts are by weight, unless otherwise stated.

*Example 1*

A blue after-coppered dyeing on artificial silk, produced with the dyestuff of Example 1 of Swiss Patent No. 236,584

[4,4'-diamino-3,3'-dimethoxy-diphenyl $\rightleftharpoons$ (2-aminobenzoic acid $\longrightarrow$ 2-amino-5-hydroxy-naphthalene-7-sulfonic acid)$_2$]

is printed by roller printing with a neutral hydrosulfite discharge paste prepared as follows:

| | Parts |
|---|---|
| Industrial gum 1:1 | 400 |
| Mixture of ⅗ formaldehyde sodium sulfoxylate and ⅖ zinc oxide | 250 |
| Sodium zinc cyanide | 25 |
| Water | 325 |
| | 1000 |

Then it is steamed and worked up in the usual manner. Thus a pure white discharge design will be obtained, whereas without addition of the sodium zinc cyanide only a useless grey-brown discharge ground would be produced. Similar results are obtained with corresponding quantities of the agents yielding cyano ions mentioned above sub 1 to 4, instead of sodium zinc cyanide.

*Example 2*

A black, after-coppered dyeing on viscose rayon produced with the dyestuff of Example 2 of Swiss patent application Ser. No. 80,265

[cf. Swiss Patent No. 250,813; m-cresotinic acid $\longleftarrow$ 4,4'-diamino-3,3'-dimethoxydiphenyl $\longrightarrow$ (5-nitro-2-aminobenzoic acid $\longrightarrow$ 2-amino-5-hydroxynaphthalene-7-sulfonic acid)]

is printed by roller printing with an alkaline hydrosulfite discharge paste prepared as follows:

| | Parts |
|---|---|
| Starch tragacanth thickening | 400 |
| Mixture of ⅗ formaldehyde sodium sulfoxylate and ⅖ zinc oxide | 150 |
| Formaldehyde sodium sulfoxylate | 100 |
| Potash | 50 |
| Zinc cyanide | 25 |
| Concentrated ammonia water | 25 |
| Water | 250 |
| | 1000 |

Then it is steamed and further treated in the usual manner. Thus a pure white discharge design is produced on the black dyeing, whereas without addition of zinc cyanide only an olive brown discharge ground will result. Similar results are obtained when using, instead of zinc cyanide, corresponding quantities of the agents yielding cyano ions and mentioned sub 1 to 3 in the foregoing specification.

*Example 3*

A brown, copper-containing dyeing on artificial silk produced with the trisazo dyestuff disclosed in French Patent No. 858,095, Example 1 thereof

[salicylic acid $\longleftarrow$ benzidine $\longrightarrow$ (2-amino-1-hydroxy benzene-4-sulfamide $\longrightarrow$ resorcinol)]

is printed with a hydrosulfite discharge paste prepared as described in the above Example 2; then further procedure is in the usual way. Thus a pure white discharge design is produced on the brown dyeing, whereas without addition of zinc cyanide to the discharge paste only an orange brown discharge ground will result.

*Example 4*

A green-blue dyeing on artificial silk, produced with the after-coppered dyestuff called Diphenyl Brilliant Blue FF (Schultz, Farbstofftabellen, 7th edition, No. 510) is printed with a hydrosulfite discharge paste prepared in the manner indicated in the above Example 2. After a usual working up a pure white discharge design is produced on the green-blue dyeing, while without addition of zinc cyanide to the discharge paste only a valueless brownish discharge ground is obtained.

*Example 5*

A black, after-coppered dyeing on viscose rayon, produced with the dyestuff of Example 2 of Swiss patent application Ser. No. 80,265 (see Example 2, supra), is printed by roller printing with an alkaline hydrosulfite discharge paste of the following composition:

| | Parts |
|---|---|
| Starch-tragacanth thickening | 400 |
| Mixture of ⅗ formaldehyde sodium sulfoxylate and ⅖ zinc oxide | 150 |
| Formaldehyde sodium sulfoxylate | 100 |
| Potash | 50 |
| Formaldehyde cyanohydrine | 30 |
| Concentrated ammonia water | 20 |
| Water | 250 |
| | 1000 |

Then the material is steamed and further worked in the usual manner. Thus a pure, white discharge design is obtained on the black dyeing, whereas without addition of formaldehyde cyanohydrine to the discharge paste only an olive brown discharge ground is produced.

Example 6

The dyeing used in the above Example 1 is printed with an alkaline hydrosulfite discharge paste of the following composition:

| | Parts |
|---|---|
| Industrial gum 1:1 | 400 |
| Mixture of ⅗ formaldehyde sodium sulfoxylate and ⅖ zinc oxide | 150 |
| Formaldehyde sodium sulfoxylate | 100 |
| Potash | 50 |
| Benzaldehyde sulfonic acid cyanohydrine (obtainable from benzaldehyde-3-sulfonic acid with hydrocyanic acid) | 30 |
| Concentrated ammonia water | 20 |
| Water | 250 |
| | 1000 |

Then the goods are steamed and further worked in the usual manner. Thus, on the blue dyeing, a pure white discharge design is produced, whereas without addition of benzaldehyde sulfonic acid cyanohydrine only a brownish discharge ground will be obtained.

Example 7

A blue dyeing on viscose rayon, produced with the dyestuff of Example 1 of Swiss Patent No. 236,584 (see Example 1, supra) and after-treated with a copper-containing fixation agent, as well as with copper acetate, is printed by roller printing with a neutral hydrosulfite discharge paste prepared as follows:

| | Parts |
|---|---|
| Industrial gum 1:1 | 400 |
| Mixture of ⅗ formaldehyde sodium sulfoxylate and ⅖ zinc oxide | 150 |
| Formaldehyde sodium sulfoxylate | 100 |
| Potash | 50 |
| Zinc cyanide | 25 |
| Concentrated ammonia water | 25 |
| Water | 250 |
| | 1000 |

The material is steamed and further processed in the usual manner. Thus sharp white discharge figures are obtained, whereas a design treated in exactly the same manner with a discharge paste containing no zinc cyanide will only produce unsharp spotted brownish discharge figures.

Example 8

A green-blue dyeing on viscose rayon, produced with the dyestuff called Diphenyl Brilliant Blue FF (Schultz, Farbstofftabellen, 7th edition, No. 510) and after-treated with a copper-containing fixation agent, is printed with the hydrosulfite discharge paste described in the above Example 7. After the usual working up a pure white discharge design is produced on the green-blue dyeing, whereas the same hydrosulfite discharge paste without zinc cyanide is only incompletely efficacious and produces spotted designs.

If, instead of the above dyeing, a dyeing produced with the dyestuff of Example 1 of Swiss Patent No. 236,584 (see Example 1, supra) and after-treated with a copper-containing fixation agent is used, the discharge paste described in the above Example 7 yields beautiful white discharge figures, while in the absence of zinc cyanide the same discharge paste is not capable of producing white discharge areas.

Example 9

A green dyeing produced viscose rayon with the dyestuff of Swiss Patent No. 153,709

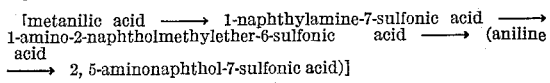

and made fast to washing by means of a copper-containing fixation agent, is printed by roller printing with the hydrosulfite discharge paste described in the above Example 7, then steamed and thoroughly rinsed. Thus white to slightly yellowish discharge figures are obtained, whereas the same discharge paste containing no zinc cyanide produces only brown-violet discharge grounds.

Example 10

A violet viscose rayon dyeing, made with the diazo dyestuff resulting from a p-aminobenzene sulfonic acid as starting component, 1-amino-2-methoxy-5-methylbenzene as middle component and 2-phenylamino-5-hydroxynaphthalene-7-sulfonic acid as final component, which dyeing has been made fast to washing by treating it with a copper-containing fixation agent, is printed with the hydrosulfite discharge paste described in the above Example 7, then steamed and rinsed. Thus pure white discharge figures will be produced, whereas the same discharge paste containing no zinc cyanide gives only grey discharge grounds.

The following table shows some further examples, (a) being the discharge ground of the dyeing when using a hydrosulfite discharge paste like that described in Example 1, and (b) being the discharge ground of the dyeing when using a hydrosulfite discharge paste in the absence of zinc cyanide.

Table

| | Dyestuff | Shade of the Viscose Rayon Dyeing | Discharge Print After Treatment With Cu-Containing Fixation Agent |
|---|---|---|---|
| 1 | Direct Fast Scarlet B (Schultz No. 584) | scarlet | (a) yellowish white. (b) grey-brown. |
| 2 | Cupranil Brown R (Schultz No. 682) | brown | (a) white. (b) brown. |
| 3 | Direct Brown M (Schultz No. 412) | ----do---- | (a) white. (b) brown. |
| 4 | Dyestuff of Swiss¹ Pat. No. 199,104 | blue-green | (a) white. (b) brownish. |

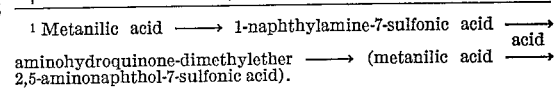

Of course, any other cyanide compound can be substituted for zinc cyanide in the above examples.

What we claim is:

1. A process for the production of pure white discharging effects on cellulosic materials dyed with dischargeable dyestuffs and treated with copper-containing agents which comprises applying to the materials a discharge composition containing a thickening agent as well as a sulfoxylate formaldehyde compound and treating the discharged areas of the materials with an agent yielding cyano ions.

2. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and an agent yielding cyano ions.

3. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and a salt of the hydrocyanic acid yielding cyano ions.

4. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and an alkali cyanide.

5. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and sodium cyanide.

6. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and zinc-cyanide in ammonia.

7. A process for the production of pure white discharging effects on cellulosic materials dyed with dischargeable dyestuffs and treated with copper-containing agents, which comprises applying to the materials a discharge composition containing a thickening agent, a sulfoxylate formaldehyde compound and the water-soluble sodium zinc cyanide.

CHARLES BABEY.
FREDERIC LEATHLEY GOODALL.